H. T. THOMAS.
AUTOMOBILE BODY.
APPLICATION FILED SEPT. 5, 1914.

1,180,340.

Patented Apr. 25, 1916.
2 SHEETS—SHEET 1.

WITNESSES
Robert N. Van Boskerck
Agnes M. Hipkins

INVENTOR
Horace T. Thomas
BY
Ralgemond H. Parker
ATTORNEY

H. T. THOMAS.
AUTOMOBILE BODY.
APPLICATION FILED SEPT. 5, 1914.

1,180,340.

Patented Apr. 25, 1916.
2 SHEETS—SHEET 2.

WITNESSES
Robert N. Van Dabirds
Agnes M. Hipkins

INVENTOR
Horace T. Thomas
BY Raymond A. Parker
ATTORNEY

UNITED STATES PATENT OFFICE.

HORACE T. THOMAS, OF LANSING, MICHIGAN, ASSIGNOR TO REO MOTOR CAR COMPANY, OF LANSING, MICHIGAN, A CORPORATION OF MICHIGAN.

AUTOMOBILE-BODY.

1,180,340.	Specification of Letters Patent.	Patented Apr. 25, 1916.

Application filed September 5, 1914. Serial No. 860,339.

*To all whom it may concern:*

Be it known that I, HORACE T. THOMAS, a citizen of the United States, residing at Lansing, county of Ingham, State of Michigan, have invented a certain new and useful Improvement in Automobile-Bodies, and declare the following to be a full, clear, and exact description of the same, such as will enable others skilled in the art to which it pertains to make and use the same, reference being had to the accompanying drawings, which form a part of this specification.

This invention relates to automobile bodies and has for its object a body, especially a tonneau, the left side rear door of which is omitted and the place taken by a collapsible seat. This construction does away with the door on the left side which is a menace to safety on account of people getting out on the left side of the car right in the path of traffic, especially is this true with children who are usually carried in the rear seat.

Figure 1:
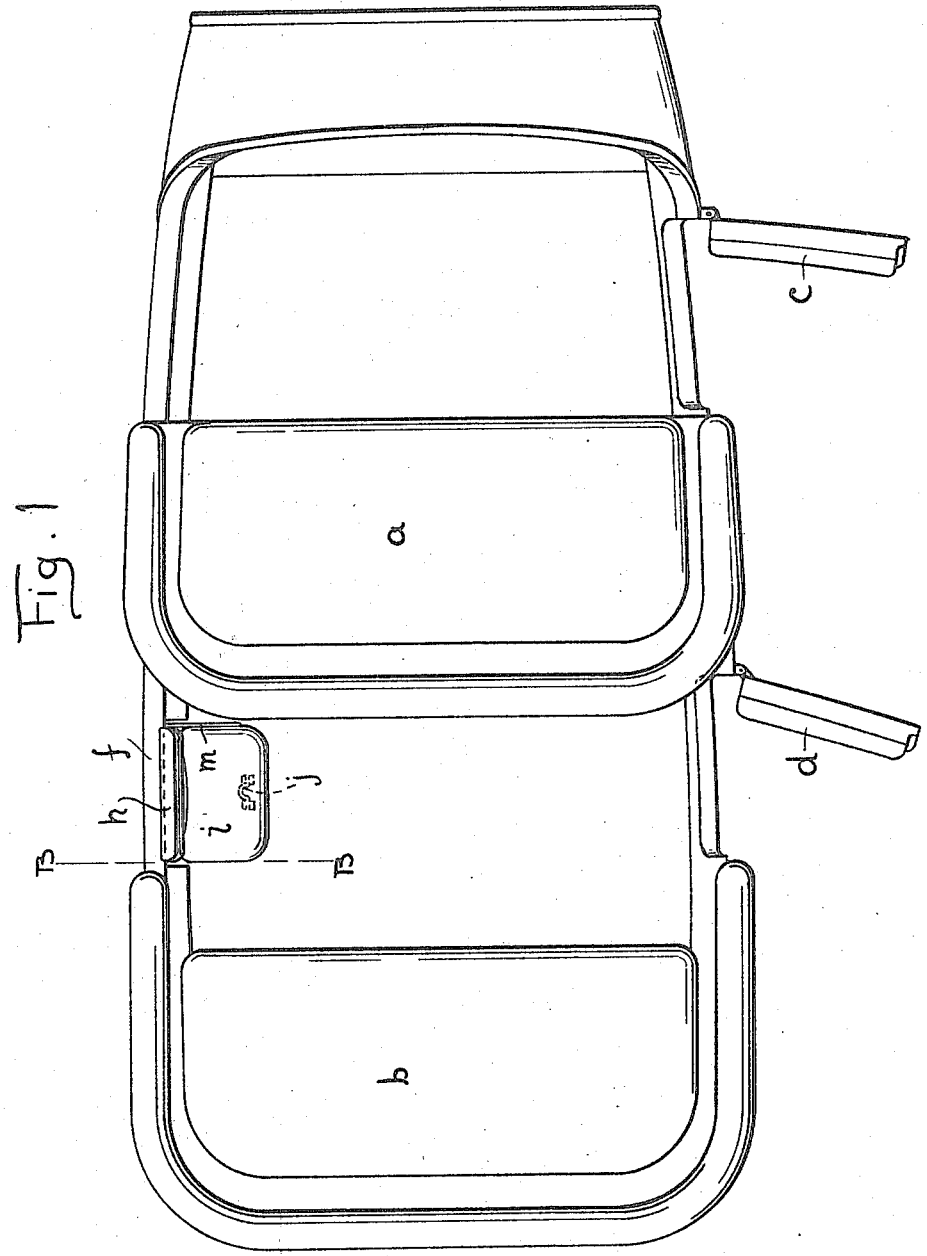
Figures 2, 3:
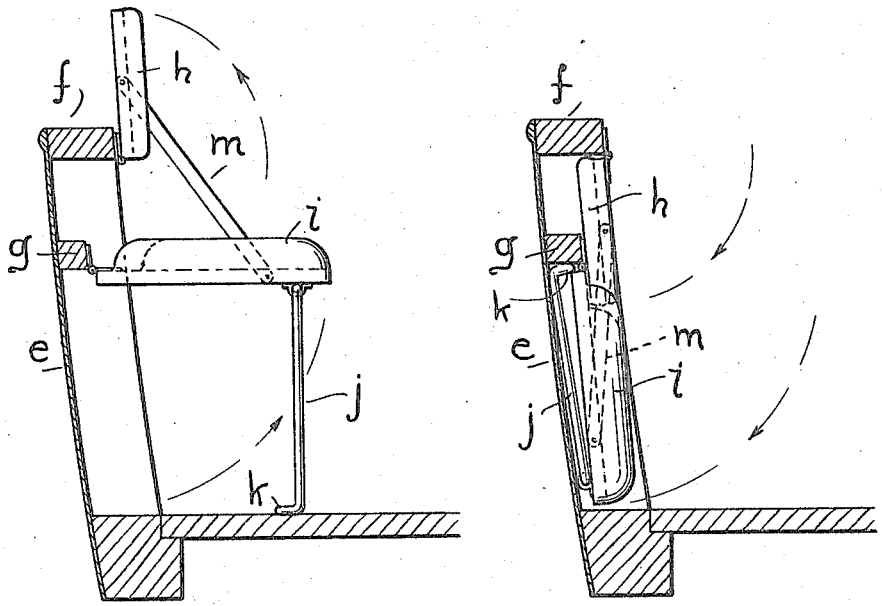
Figure 4:
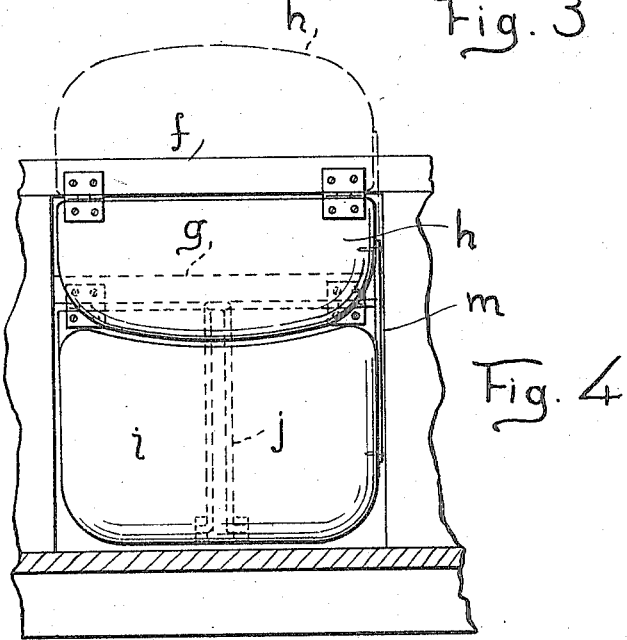

The advantages of this new construction and the particularities of description herein follow:

In the drawings: Figure 1, is a plan view of a tonneau. Fig. 2, is a section on the line B—B of Fig. 1. Fig. 3, is a section on the same line showing the seat folded against the side of the body. Fig. 4, is a front view of the seat folded into the recess and forming part of the inside wall of the tonneau.

The front seat is designated $a$. the rear seat $b$. The front and rear right side doors are designated $c$ and $d$ respectively. No front left side door is shown, although as far as my invention is concerned a front left side door may be used if desired.

The place of the rear left side door is taken by my collapsible seat. The metal covering $e$ which covers the rear of the body is continued on the left side and merges into the body structure of the front seat. The rail $f$ spans the space ordinarily occupied by the left side door. Below this rail is a second rail $g$ somewhat narrower and spanning the space ordinarily occupied by the left side door. The seat back $h$ preferably upholstered, is hinged to the upper rail $f$, while the seat $i$, preferably upholstered, is hinged to the lower rail $g$. A leg $j$ is pivoted to the front of the seat $i$ and comprises a double rod bent over at its free end to form a foot $k$. A link $m$ connects the forward end of the seat $i$ with the mid-portion of the seat back $h$. Hence when the leg $j$ is folded up parallel with the seat $i$, the seat $i$ will drop to a position parallel with the metal covering $e$ drawing with it the seat back $h$ so that the parts assume the position shown in Fig. 3. The under side of the seat back and the upper side of the seat then become part of the inside wall of the car body. They are suitably upholstered or trimmed with this purpose in view. The side wall of the car on the side of which this collapsible seat is attached is made of sufficient thickness to provide the two recesses into which the seat back and the seat withdraw and the seat back and the seat are shaped so that they will fit together when the two withdraw into the respective recesses for their reception. The thickness of the seat and the back and the location of the hinges are so arranged that when the seat and seat back are folded down, as shown in Fig. 3, they are substantially flush with the rest of the inside wall of the body so that a neat appearance results.

From the above description it will be seen that an ordinary four-passenger car is readily converted into a five-passenger car by bringing out this seat, yet when the seat is withdrawn into the recess it is completely out of the way.

What I claim is:

1. The combination with a body provided with a side wall having an outside shell and a rail at the top of the shell and inside of the shell, and a second rail below the first-mentioned rail, of a seat back hinged to the upper rail and a seat hinged to the lower rail, a link connecting the seat back and seat and a pivoted leg for the seat.

2. The combination with a body provided with a side wall comprising an outer shell or covering, a top rail on the inside of the shell or covering and a narrower second rail underneath the top rail, of a seat back hinged to the top rail, a seat hinged to the lower rail, a link connecting the seat and seat back, and a pivoted leg attached to the seat, said seat and seat back being arranged to fold into the recess under the rails and lie substantially flush with the inside face of the side wall.

3. The combination with a body or supporting member, of a seat back hinged to the said body or supporting member and adapted to swing upward into a position for service, a seat also hinged to the body or supporting member beneath the seat back and adapted to swing upward into a position substantially perpendicular with respect to the body or supporting member, and means for supporting said seat in such perpendicular position.

4. The combination with a side wall, of a seat back hinged thereto and foldable upward into a position for service, a seat hinged to the wall below the seat back and foldable upward into a position substantially perpendicular with respect to the wall, means for supporting the seat back in such perpendicular position, and a link joining the seat back and the seat causing the two to operate together.

5. The combination with a side wall, of a seat back hinged thereto and foldable upward into a position for service, a seat hinged to the wall below the seat back and foldable upward to a position substantially perpendicular to the wall, a link connecting the seat back and seat, and a foldable leg secured to the seat for supporting the seat in position for service.

6. The combination with a tonneau closed on one side in a space ordinarily occupied by one of the rear doors and the said tonneau body at this point being provided with a recess, of a folding seat comprising a seat back supported by the said body in a position parallel with the side wall of the body when the seat is collapsed so that the back of the seat back forms the inside face of the side wall of the body, the said seat back being foldable upward to a position above the upper edge of the body for service, and a seat hinged to the side wall of the body below the seat back and when lying parallel with the body the face of the seat serving to form the inside face of the side wall of the body, the said seat being foldable upward into right angular position with respect to the side wall of the body and supported there for service.

In testimony whereof, I sign this specification in the presence of two witnesses.

HORACE T. THOMAS.

Witnesses:
 DONALD E. BATES,
 RICHARD H. SCOTT.

Copies of this patent may be obtained for five cents each, by addressing the "Commissioner of Patents, Washington, D. C."